US012639166B2

(12) United States Patent
Kwong et al.

(10) Patent No.: US 12,639,166 B2
(45) Date of Patent: May 26, 2026

(54) VALLEY CHECK MEMORY SYSTEM COMMAND

(71) Applicant: Micron Technology, Inc., Boise, ID (US)

(72) Inventors: Charles S. Kwong, Redwood City, CA (US); Seungjune Jeon, Santa Clara, CA (US); Jun Wan, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/788,550

(22) Filed: Jul. 30, 2024

(65) Prior Publication Data

US 2025/0117289 A1     Apr. 10, 2025

Related U.S. Application Data

(60) Provisional application No. 63/542,901, filed on Oct. 6, 2023.

(51) Int. Cl.
*G06F 11/10* (2006.01)
*G06F 11/07* (2006.01)

(52) U.S. Cl.
CPC ........ *G06F 11/1068* (2013.01); *G06F 11/076* (2013.01); *G06F 11/1016* (2013.01)

(58) Field of Classification Search
CPC .............. G06F 11/1068; G06F 11/076; G06F 11/10116
USPC ........................................................ 714/764
See application file for complete search history.

(56) References Cited

U.S. PATENT DOCUMENTS

| | | | |
|---|---|---|---|
| 5,619,452 A | 4/1997 | Miyauchi | |
| 8,006,166 B2 * | 8/2011 | Roohparvar | ........ G06F 11/1072 |
| | | | 365/201 |
| 2009/0323412 A1 | 12/2009 | Mokhlesi et al. | |
| 2016/0035417 A1 * | 2/2016 | Park | .................... G11C 11/1659 |
| | | | 365/148 |
| 2016/0197623 A1 * | 7/2016 | Varanasi | ............. G06F 11/1012 |
| | | | 714/764 |
| 2016/0284417 A1 | 9/2016 | Atsumi | |
| 2018/0068736 A1 * | 3/2018 | Kim | ..................... G11C 29/028 |

(Continued)

OTHER PUBLICATIONS

"International Application Serial No. PCT/US2024/040157, International Search Report mailed Nov. 18, 2024", 3 pgs.

(Continued)

*Primary Examiner* — Esaw T Abraham
*Assistant Examiner* — Enam Ahmed
(74) *Attorney, Agent, or Firm* — Schwegman Lundberg & Woessner, P.A.

(57) ABSTRACT

Aspects of the present disclosure configure a system component, such as memory sub-system controller, to detect read errors in one or more memory cells using a plurality of read thresholds. The controller selects, for inspection, a target valley of a plurality of valleys associated with an individual memory component of the set of memory components. The controller reads the target valley using a first read threshold to obtain a first set of data and reads the target valley using a second read threshold to obtain a second set of data. The controller compares the first set of data to the second set of data and performs one or more memory operations on the target valley in response to comparing the first set of data to the second set of data.

20 Claims, 7 Drawing Sheets

(56)                    References Cited

U.S. PATENT DOCUMENTS

| 2019/0295659 A1 | 9/2019 | Hong et al. |
| 2020/0075118 A1* | 3/2020 | Chew .................... G11C 16/26 |
| 2021/0019078 A1 | 1/2021 | Sheperek et al. |
| 2022/0180957 A1 | 6/2022 | Yang et al. |
| 2023/0062445 A1 | 3/2023 | Lee et al. |
| 2024/0134559 A1 | 4/2024 | Kim |

OTHER PUBLICATIONS

"International Application Serial No. PCT/US2024/040157, Written Opinion mailed Nov. 18, 2024", 4 pgs.
U.S. Appl. No. 17/972,174, filed Oct. 24, 2022, Identifying Center of Valley in Memory Systems.

* cited by examiner

500

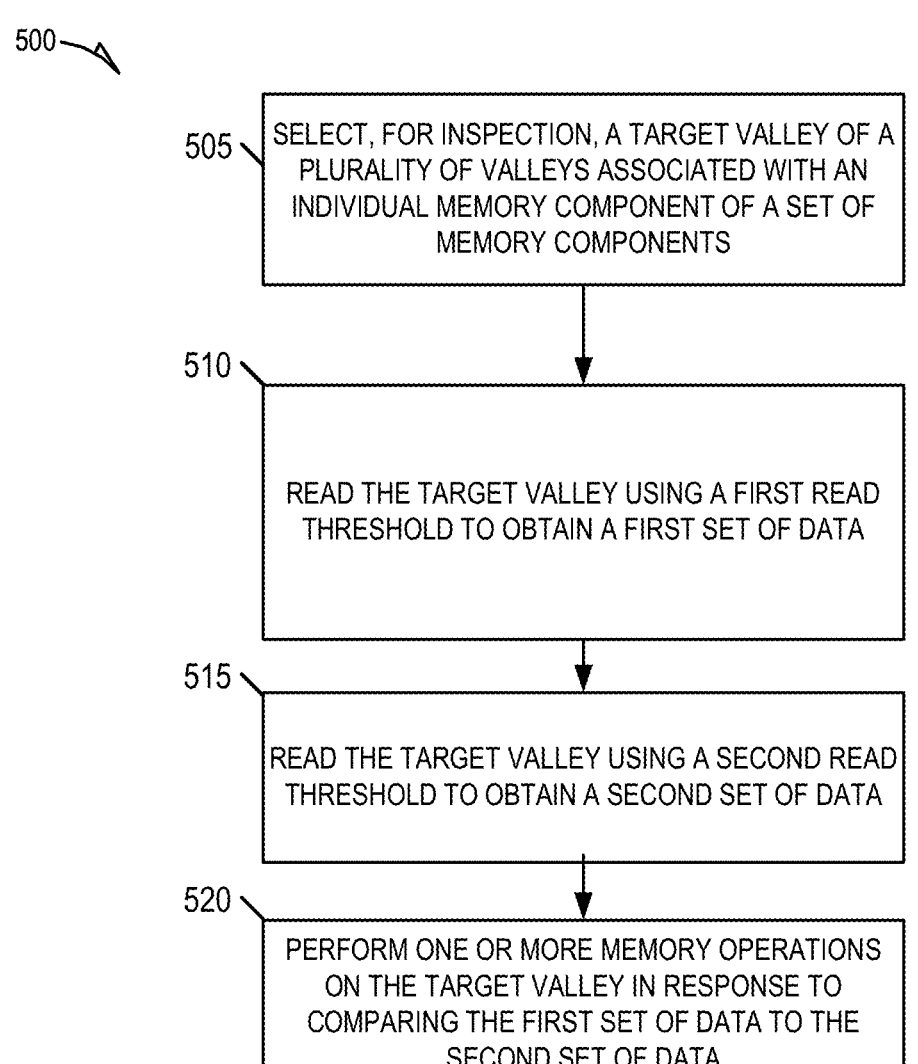

505 — SELECT, FOR INSPECTION, A TARGET VALLEY OF A PLURALITY OF VALLEYS ASSOCIATED WITH AN INDIVIDUAL MEMORY COMPONENT OF A SET OF MEMORY COMPONENTS

510 — READ THE TARGET VALLEY USING A FIRST READ THRESHOLD TO OBTAIN A FIRST SET OF DATA

515 — READ THE TARGET VALLEY USING A SECOND READ THRESHOLD TO OBTAIN A SECOND SET OF DATA

520 — PERFORM ONE OR MORE MEMORY OPERATIONS ON THE TARGET VALLEY IN RESPONSE TO COMPARING THE FIRST SET OF DATA TO THE SECOND SET OF DATA

*FIG. 5*

VALLEY CHECK MEMORY SYSTEM COMMAND

PRIORITY APPLICATION

This application claims the benefit of priority to U.S. Provisional Application Ser. No. 63/542,901, filed Oct. 6, 2023, which is incorporated herein by reference in its entirety.

TECHNICAL FIELD

Examples of the disclosure relate generally to memory sub-systems and more specifically to correcting read levels in a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIGS. 5 and 6 are flow diagrams of example methods to perform read error correction, in accordance with some examples.

DETAILED DESCRIPTION

Figure 1:
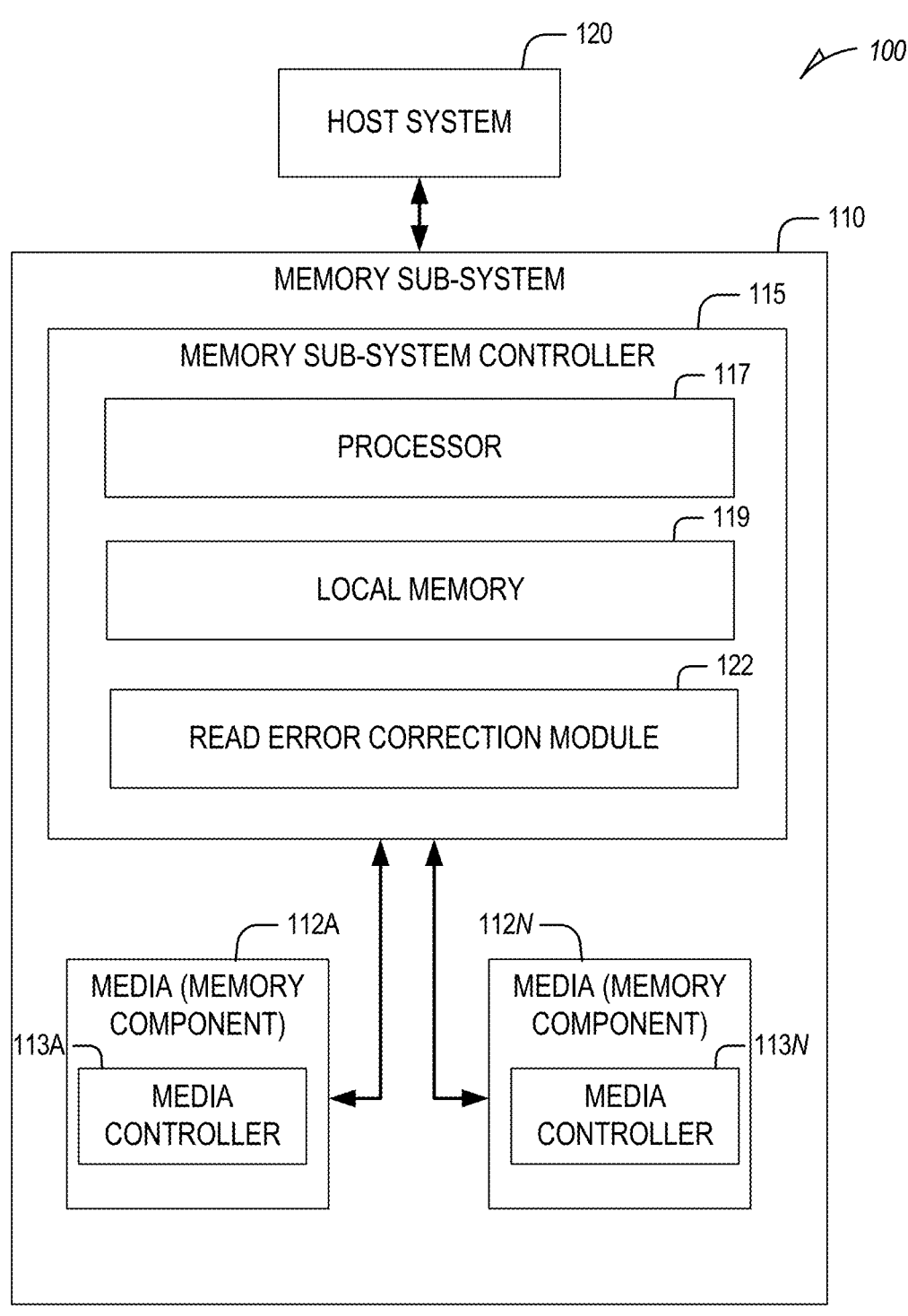
FIG. 1 is a block diagram illustrating an example computing environment including a memory sub-system, in accordance with some examples.

Aspects of the present disclosure configure a system component, such as a memory sub-system controller, to detect and/or correct read thresholds associated with one or more valleys or CoVs of one or more memory components. Data can be read from memory components using different read bias levels or read levels (also referred to as read thresholds). The disclosed controller can detect an error in the data read at an individual read level and can correct the read level. Specifically, the controller reads data from a selected valley at different read thresholds. The controller can then compare the data read at the different read thresholds to perform one or more memory operations. Namely, if the number of bits detected between the different read thresholds transgresses a threshold value, the controller can generate status information indicating that the valley or memory cells associated with the selected valley failed the read verify operation. In such cases, the controller can refresh or fold the data stored in the selected valley. The reading of data at the different read thresholds to detect presence of read errors can be performed in response a single memory command, such as a media scan or read disturb scan command, which improves the overall efficiency of operating the memory system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can send access requests (e.g., write command, read command, sequential write command, sequential read command) to the memory sub-system, such as to store data at the memory sub-system and to read data from the memory sub-system. The data specified by the host is hereinafter referred to as "host data" or "user data".

The memory sub-system can initiate media management operations, such as a write operation, on host data that is stored on a memory device. For example, firmware of the memory sub-system may re-write previously written host data from a location on a memory device to a new location as part of garbage collection management operations or folding operations. The data that is re-written, for example as initiated by the firmware, is hereinafter referred to as "garbage collection data".

"User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

A memory device can be a non-volatile memory device. A non-volatile memory device is a package of one or more dice. Each die can comprise one or more planes. Each logical block address (LBA) of the memory device comprises a set of pages. Each page comprises a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

Conventional memory sub-systems can employ error-correction techniques that involve a decoding process. Such decoding processes can include application of a Low Density Parity Check (LDPC) error code check (ECC) engine to data read from the memory device. The parameters of the LDPC ECC engine can be adjusted to perform more or less complex decoding operations, such as those that utilize hard bit decoding and/or those that utilize soft-bit decoding operations. By performing such error-correction techniques, if a data member of the collection is lost (e.g., corrupted) for any reason, the LDPC ECC engine can be applied to recreate the lost data. In some cases, data can still not be completely recovered even after performing various error correction processes. For example, data can be stored and represented in the memory sub-system at different read levels each associated with a different CoV or valley of a plurality of valleys or states. Specifically, in a tri-level cell (TLC) memory device, data can be stored in one of eight different read levels of the memory sub-system. Charges stored at the different read levels can be read and interpreted into a set of three bits. Ideally, the data is read by applying a read level (or read threshold) within a CoV which defines a range of voltage levels that can be applied to accurately read the data from an individual one of the eight different read levels or valleys.

In certain situations, the charges stored at one of the read levels can be lost or shifted around which result in inaccuracies when read at the predetermined read level or even within a previously computed CoV. In these circumstances, as part of correcting the read errors that are encountered, the read level or CoV used to read the data may need to be adjusted. One way to adjust the read level may involve preforming reads at adjacent read levels that are offset from the predetermined read level by predefined voltage thresholds. Errors in the data can be computed at each of the adjacent read levels to determine the read level associated with the smallest amount of errors in the read data. For example, if data errors between a first pair of adjacent read levels are smaller than data errors associated with a second pair of adjacent read levels, the controller may use the read level that is in the range defined by the first pair rather than the second pair to attempt to correctly read data from the memory sub-system. While this approach generally works well, the range of read levels obtained based on the difference in error values (e.g., the range defined by the first pair of read levels) is usually far too large to provide adequate and accurate read levels. This results in poor data recovery and failure to recover data in performing error correction. Also having to perform multiple read operations on the same valley is inefficient and slows down the overall operation of the memory sub-system.

Aspects of the present disclosure address the above and other deficiencies by configuring a system component, such as a memory sub-system controller of a memory sub-system, to determine whether to correct a read threshold associated with an individual valley using a single memory command. Specifically, the controller obtains first and second data sets read from applying two different read thresholds or read levels to an individual valley of a same memory component. The controller determines, based on the first and second data sets, whether a quantity of data bits that are between the two different read thresholds transgresses a threshold value. In response to this determination, the controller can perform one or more memory operations. For example, if the quantity of bits transgresses the threshold value, the controller can refresh, fold, and/or correct the data stored in the individual valley of the memory component. By determining or detecting a need to perform memory operations on the data stored in the individual valley using the same memory command and without having to perform multiple reads from multiple valleys to detect an appropriate range, efficiency of operating the memory sub-system is improved.

For instance, in some examples the memory sub-system controller selects, for inspection, a target valley of a plurality of valleys associated with an individual memory component of the set of memory components. The controller reads the target valley using a first read threshold to obtain a first set of data. The controller reads the target valley using a second read threshold to obtain a second set of data. The controller compares the first set of data to the second set of data and performs one or more memory operations on the target valley in response to comparing the first set of data to the second set of data.

In some examples, the controller computes a quantity representing a number of bits that are read between the first read threshold and the second read threshold using the first and second sets of data. In some examples, the controller compares the quantity to a threshold value and in response to determining that the quantity transgresses the threshold value, performs an error correction operation as the one or more memory operations. In some cases, the error correction operation includes adjusting a read threshold associated with reading data from the target valley.

In some examples, the error correction operation includes folding data from the individual memory component to another memory component of the set of memory components or refreshing data stored in the target valley. In some cases, the controller generates a pass or fail status in response to comparing the quantity to the threshold value. In some examples, the controller performs an OR logic operation on the first set of data and the second set of data and counts a number of zeros resulting from performing the OR logic operation to compute the quantity representing the number of bits that are read between the first read threshold and the second read threshold.

In some examples, the controller transmits the computed quantity to a host device associated with a memory system including the set of memory components. In some cases, reading the target valley using the first and second read thresholds is performed in response to a single memory command. In some cases, the single memory command includes a read disturb scan command. In some cases, the single memory command includes a media scan command.

In some examples, the target valley corresponds to a region between two states of one or more cells of the individual memory component. In some examples, the controller reads the target valley simultaneously from a plurality of word lines associated with the individual memory component using the first read threshold to obtain the first set of data. The controller reads the target valley simultaneously from the plurality of word lines associated with the individual memory component using the second read threshold to obtain the second set of data. In some cases, the controller detects an error in a read threshold associated with the target valley based on comparing a quantity of bits obtained from the plurality of word lines between the first and second read thresholds to a threshold value. In some examples, the plurality of word lines are non-adjacent word lines. In some examples, the controller performs an OR logic operation on the first and second sets of data read simultaneously from the plurality of word lines to detect presence of an error in a read threshold associated with the target valley of the individual memory component.

Though various examples are described herein as being implemented with respect to a memory sub-system (e.g., a controller of the memory sub-system, a memory component, a media controller, or combination thereof), some or all of the portions of an example can be implemented with respect to a host system, such as a software application, an operating system of the host system, or only by the media controller rather than or in addition to the memory sub-system controller.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some examples, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL), a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe or CXL interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative- and (NAND)-type flash memory. Each of the memory components 112A to 112N can include one or more arrays of memory cells such as single-level cells (SLCs) or multi-level cells (MLCs) (e.g., TLCs or QLCs). In some examples, a particular memory component 112 can include both an SLC portion and an MLC portion of memory cells. Each of the memory cells can store one or more bits of data (e.g., blocks) used by the host system 120.

Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto-resistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or LBAs that can refer to a unit of the memory component 112 used to store data. In some examples, the memory cells of the memory components 112A to 112N can be grouped into a set of different zones of equal or unequal size used to store data for corresponding applications. In such cases, each application can store data in an associated zone of the set of different zones.

The memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another example of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other operations such as wear leveling operations, garbage collection operations, folding operations, error detection and ECC operations, decoding operations, encryption operations, caching operations, address translations between a logical block address and a physical block address that are associated with the memory components 112A to 112N, address translations between an application identifier received from the host system 120 and a corresponding zone of a set of zones of the memory components 112A to 112N. This can be used to restrict applications to reading and writing data only to/from a corresponding zone of the set of zones that is associated with the respective applications. In such cases, even though there may be free space elsewhere on the memory components 112A to 112N, a given application can only read/write data to/from the associated zone, such as by erasing data stored in the zone and writing new data to the zone. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115.

The memory sub-system 110 includes a read error correction module 122 that performs or facilitates detecting and/or correcting read data errors, such as by adjusting a CoV or read threshold or level used to read data at an individual read level from an individual valley, in accordance with some examples. In some examples, the controller 115 includes at least a portion of the read error correction module 122. For example, the controller 115 can include a processor 117 (processing device) configured to execute instructions stored in local memory 119 for performing the operations described herein. In some examples, the read error correction module 122 is part of the host system 120, such as a software application or an operating system on the host system 120. In some examples, the read error correction module 122 is part of the media controller 113A and/or media controller 113N.

According to some examples, the read error correction module 122 selects, for inspection, a target valley of a plurality of valleys associated with an individual memory component of the set of memory components. The read error correction module 122 reads the target valley using a first read threshold to obtain a first set of data and reads the target valley using a second read threshold to obtain a second set of data. The read error correction module 122 compares the first set of data to the second set of data and performs one or more memory operations on the target valley in response to comparing the first set of data to the second set of data. In some examples, the read error correction module 122 reads data simultaneously from a plurality of adjacent or non-adjacent word lines associated with an individual valley. The read error correction module 122 can detect a read error associated with reading the data from the multiple word lines of the memory component and can perform an operation, such as folding data or refreshing the data stored in the memory component. The read error can be detected by counting how many bits (e.g., how many '0's) are detected between two read levels. This can be performed by computing an OR logic operation on a set of data bits read at a first read level with another set of bits read at a second read level and counting how many 0's are output by the OR logic operation. If the quantity of 0's that are output transgress a threshold value, the read error correction module 122 can determine that a read error exists which can occur if charges stored in one or more states or valleys extends into a region between the two read thresholds.

Depending on the example, the read error correction module 122 can comprise logic (e.g., a set of transitory or non-transitory machine instructions, such as firmware) or one or more components that causes the memory sub-system 110 (e.g., the memory sub-system controller 115) to perform operations described herein with respect to the read error correction module 122. The read error correction module 122 can comprise a tangible or non-tangible unit capable of performing operations described herein. Further details with regards to the operations of the read error correction module 122 are described below.

Figure 2:
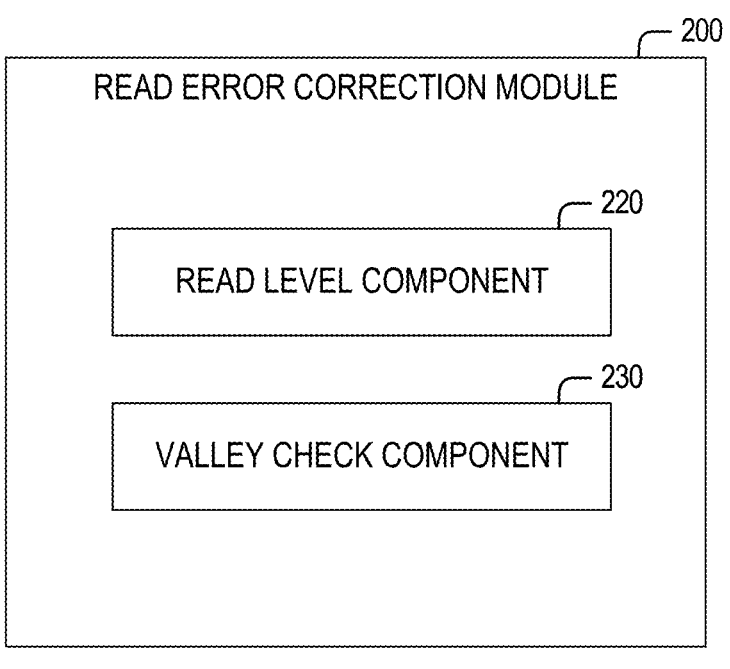
FIG. 2 is a block diagram of an example read error correction module, in accordance with some examples.

FIG. 2 is a block diagram of an example read error correction module 200, in accordance with some examples. As illustrated, the read error correction module 200 includes a read level component 220 and a valley check component 230. For some examples, the read error correction module 200 can differ in components or arrangement (e.g., less or more components) from what is illustrated in FIG. 2. The read error correction module 200 can be implemented by the memory sub-system controller 115 and/or by one or more of the media controllers 113A-N.

The read error correction module 200 can be used to detect read errors associated with reading data from the memory components 112 according to an individual read level of a plurality of read levels. In some cases, the read error correction module 200 can be used after programming data to an individual memory block or page or after a threshold period of time has passed since data has been programmed to the memory block or page. In such cases, the valley check component 230 can be instructed to perform a media scan or read disturb memory operation on the memory component (e.g., on an individual memory block and/or page of the memory component). The valley check component 230 can generate an instruction that identifies a particular valley of a plurality of valleys of the memory component.

The valley check component 230 can communicate with the read level component 220 to obtain a read level or read threshold associated with reading data from the particular valley. The read level component 220 can store a table that associates different valleys or CoVs with respective read thresholds or read levels. The valley check component 230 can select a read threshold associated with the particular valley (e.g., the target valley to be tested or checked) from the table. The valley check component 230 can then generate a pair of read thresholds (e.g., a low read level and a high read level) for reading data from the particular valley of the memory component. The low read level can correspond to the read level associated with the particular valley and the high read level can correspond to the read level associated with the particular valley and adjusted by a threshold amount. Namely, the valley check component 230 can compute the high read level by incrementing or decrementing the low read level by the threshold amount.

Figure 3:
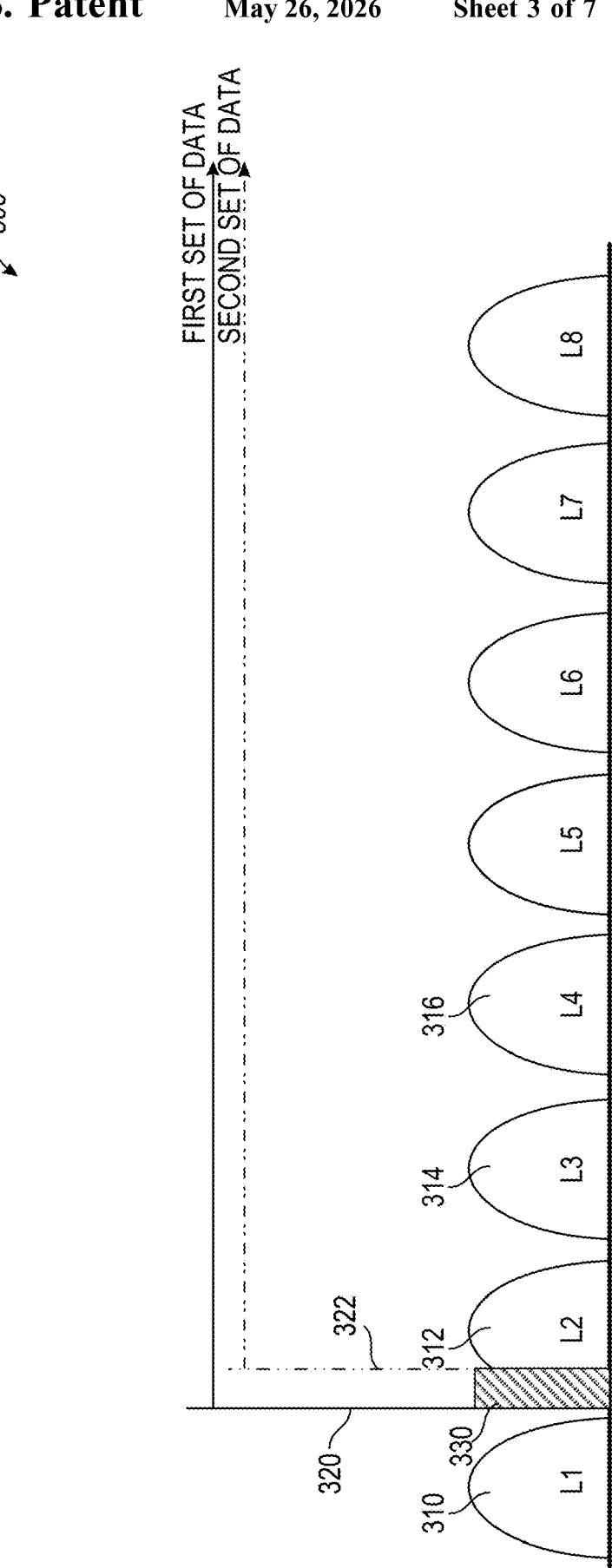
FIG. 3 presents different read levels performed for one or more valleys (center of valleys CoVs), in accordance with some examples.

For example, a distribution of valleys 300 is shown in FIG. 3. As shown in FIG. 3, memory components 112A to 112N can store data in one of eight different levels (L1-L8) (also referred to as states). Each of the different levels can be read by applying a different read threshold voltage (read level). For example, data stored in a first level 310 can be read by applying a first range of read levels, data stored in a second level 312 can be read by applying a second range of read levels, data stored in a third level 314 can be read by applying a fourth range of read levels, and data stored in a fourth level 316 can be read by applying a fifth range of read levels.

Ideally, the read level that is applied to optimally and most effectively read data from a particular level is defined by a CoV. These are referred to as valleys. In order to improve the accuracy of determining the correct CoV for each read level (which defines an appropriate range of read levels for accurately reading data from a given level), the memory components 112 store or can generate ideal or predetermined read levels or ranges of read levels for each valley in the read level component 220. In some cases, charges stored in one level or valley can move or shift into an adjacent valley. This can result in read errors which need to be addressed by performing memory operations, such as error correction operations or refresh or folding operations. For example, charges stored in first level 310 can move to a region between the first level 310 and the second level 312 and/or can shift to fall within the valley associated with the second level 312.

In order to determine whether charges have moved around or shifted enough to cause read errors to occur (also known as read disturb errors), a read disturb operation or media scan operation can be performed for one or more valleys. In such cases, the valley check component 230 can select a target valley to test, such as the valley associated with the second level 312. The valley check component 230 generates a pair of read levels (e.g., using the read threshold stored for the second level 312 in the read level component 220). The valley check component 230 applies a first read level to the memory component to obtain a first set of data 320 in response to the read disturb operation or media scan operation. In response to the same read disturb operation or media scan operation, the valley check component 230 also applies the second read level to the same memory component to obtain a second set of data 322.

The valley check component 230 can compare the first set of data 320 with the second set of data 322 to determine whether a read error exists in the second level 312 of the memory component. For example, the valley check component 230 can determine whether a quantity of bits read in the region 330 that falls between the first and second read levels transgresses a threshold value. This can be performed by the valley check component 230 computing an OR logic operation on the bits of data of the first set of data 320 and the bits of data of the second set of data 322. The valley check component 230 can count how many asserted bits (e.g., '0's) result from the OR logic operation to determine how many asserted bits are in the region 330. If the quantity of bits transgresses the threshold value, the valley check component 230 can determine that a read disturb has occurred and a read error is present. The valley check component 230 can then perform one or more memory operations to address the read error, such as by performing error correction operations, folding the data, and/or performing refresh operations on the data stored in the memory component (e.g., the memory page and/or memory block).

Figure 4:
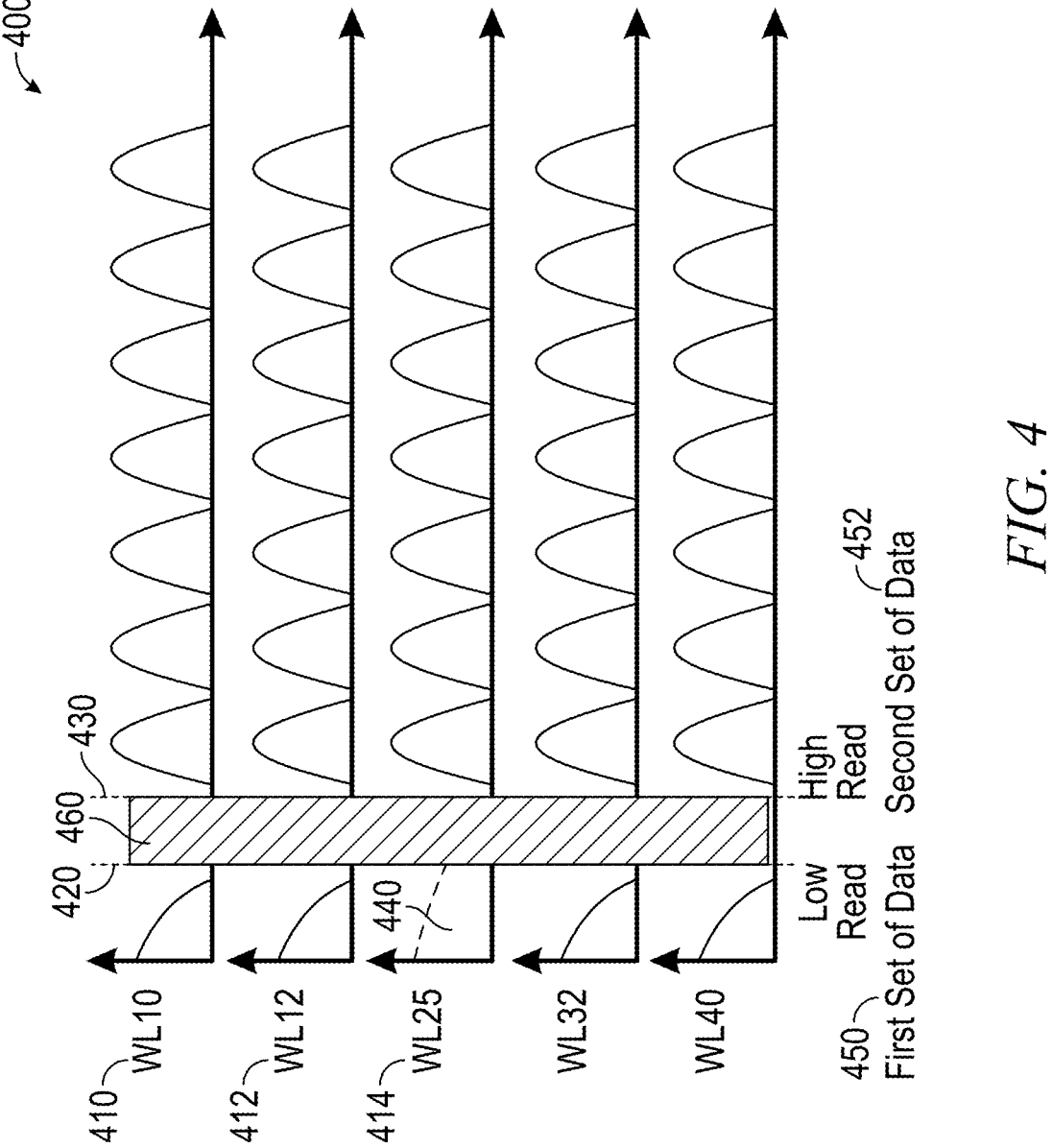
FIG. 4 presents different read levels performed across a set of word lines (WLs) of a same valley, in accordance with some examples.

In some examples, the valley check component 230 can test a plurality of word lines simultaneously in response to the single same read disturb operation or media scan operation. Namely, rather than performing multiple reads on a first word line to determine whether there exist read errors on data stored in a valley of just the first word line and then having to repeat the multiple reads on a second word line to determine whether there exist read errors on data stored in the valley of the second word line, multiple word lines can be tested in parallel. Specifically, as shown in the diagram 400 of FIG. 4, a plurality of word lines including a first WL 410, a second WL 412, and a third WL 414 (which can be adjacent or non-adjacent) can be used to store data across multiple valleys or states of an individual memory component. In such cases, the valley check component 230 can apply a first read threshold or first read first read level 420 to simultaneously obtain a first set of data 450 from the plurality of word lines. The valley check component 230 can then apply a second read threshold or second read level 430 to simultaneously obtain a second set of data 452 from the same plurality of word lines and for the same target state or valley.

The valley check component 230 can then compare the first set of data 450 with the second set of data 452 to determine whether a quantity of bits within a region 460 between the first read level 420 and the second read level 430 transgresses a threshold value. For example, the valley check component 230 can perform an OR logic operation on all of the bits obtained by applying the first read level 420 across all of the plurality of word lines (e.g., the first set of data 450) and all of the bits obtained by applying the second read level 430 across all of the plurality of word lines (e.g., the first set of data 450). The valley check component 230 can count how many 0's exits in the result of performing the OR logic operation and compare that counted number of 0's to the threshold value. The valley check component 230 can determine if the number of bits in the region 460 transgresses the threshold value. If so, the valley check component 230 can determine that a read error occurs in at least one of the plurality of word lines. For example, charges 440 stored in one of the states of the third WL 414 can shift over to fall within the region 460. In such cases, the region 460 can return a quantity of bits greater than the threshold value and the valley check component 230 determines that a read error exists.

In some examples, the valley check component 230 can then perform one or more memory operations to address the read error, such as by performing error correction on the plurality of word lines, refreshing the data stored in the plurality of word lines, and/or folding the data stored in the plurality of word lines. Because all of the word lines are read simultaneously, the valley check component 230 may not be able to determine which specific word line caused the read error. As a result, the valley check component 230 performs the memory operation across all of the plurality of word lines rather than just one individual word line that caused the read error to occur.

FIG. 5 is a flow diagram of an example method 500 to perform read error correction, in accordance with some examples. Method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 500 is performed by the memory sub-system controller 115 of FIG. 1. In these examples, the method 500 can be performed, at least in part, by the read error correction module 122. Although the processes are shown in a particular sequence or order, unless otherwise specified, the order of the processes can be modified. Thus, the illustrated examples should be understood only as examples; the illustrated processes can be performed in a different order, and some processes can be performed in parallel. Additionally, one or more processes can be omitted in various examples. Thus, not all processes are required in every example. Other process flows are possible.

Referring now to FIG. 5, the method 500 or process begins at operation 505, with a processing device of a memory sub-system (e.g., of processor of the memory sub-system controller 115) selecting, for inspection, a target valley of a plurality of valleys associated with an individual memory component of a set of memory components. At operation 510, the processing device of the memory sub-system reads the target valley using a first read threshold to obtain a first set of data and, at operation 515, reads the target valley using a second read threshold to obtain a second set of data. The processing device of the memory sub-system, at operation 520, performs one or more memory operations on the target valley in response to comparing the first set of data to the second set of data.

Figure 6:
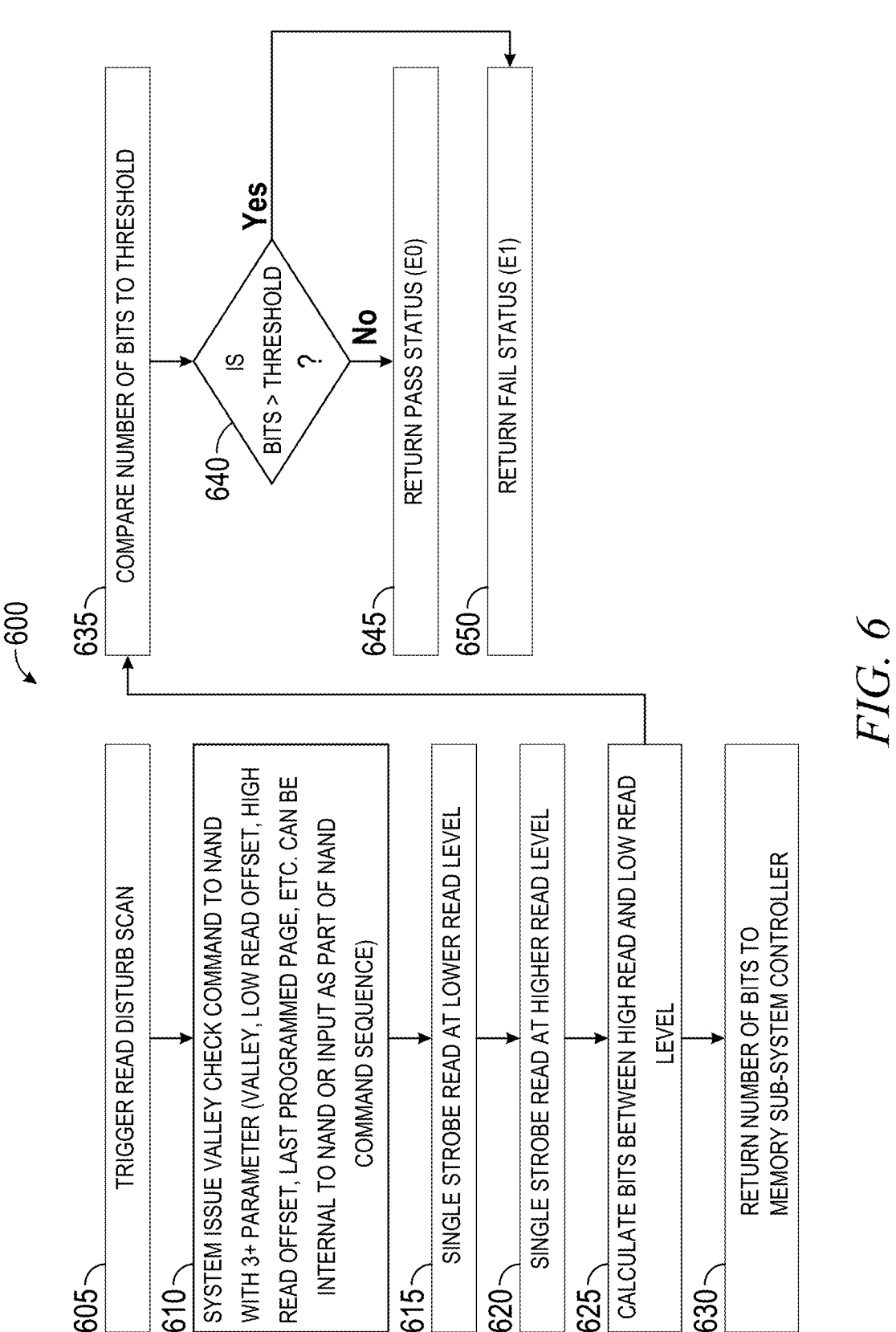

FIG. 6 is a flow diagram of an example method 600 to perform read error correction, in accordance with some examples. Method 600 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 600 is performed by the memory sub-system controller 115 of FIG. 1. In these examples, the method 600 can be performed, at least in part, by the read error correction module 122. Although the processes are shown in a particular sequence or order, unless otherwise specified, the order of the processes can be modified. Thus, the illustrated examples should be understood only as examples; the illustrated processes can be performed in a different order, and some processes can be performed in parallel. Additionally, one or more processes can be omitted in various examples. Thus, not all processes are required in every example. Other process flows are possible.

Referring now to FIG. 6, the method 600 or process begins at operation 605, with a processing device of a memory sub-system (e.g., of processor of the memory sub-system controller 115) triggering a read disturb scan operation, such as after storing data to an individual memory component, memory block, and/or page or after a threshold period of time elapses since data has been stored to the individual memory component, block or page. Then, at operation 610, the processing device issues a valley check command which can include a plurality of parameters. The valley check command can identify a target valley, a low read threshold, and a high read threshold to apply to read data from the target valley of the individual memory component (e.g., the last page that has been programmed to the individual memory component). The processing device, at operation 615, issues a single strobe read at the low read threshold and, at operation 620, issues a single strobe read at the high read threshold.

The processing device, at operation 625, computes a quantity of bits that are read between the high read threshold and the low read threshold. The processing device, in some cases, provides that quantity of bits, at operation 630, to the host system 120 and/or to the memory subsystem controller 115. The host system 120 and/or to the memory subsystem controller 115 can then perform one or more memory operations based on the quantity of bits. For example, the host system 120 and/or to the memory subsystem controller 115 can instruct the processing device to refresh or fold the data stored at the target valley or to perform one or more error correction operations on the data stored at the target valley or adjusts the read threshold used to read data from the target valley.

In some examples, the processing device, at operation 635, compares the number of bits (e.g., the quantity of bits between the high and low read thresholds or levels) to a threshold value. At operation 640, the processing device determines if the quantity of bits transgresses the threshold value. In response to determining that the quantity of bits fails to transgress the threshold value, the processing device, at operation 645, returns or generates a pass status for the read disturb scan command. In response to determining that the quantity of bits transgresses the threshold value, the processing device, at operation 650, returns or generates a failed status for the read disturb scan command.

In view of the disclosure above, various examples are set forth below. It should be noted that one or more features of an example, taken in isolation or combination, should be considered within the disclosure of this application.

Example 1. A system comprising: a set of memory components; and at least one processing device, operatively coupled to the set of memory components, configured to perform operations comprising: selecting, for inspection, a target valley of a plurality of valleys associated with an individual memory component of the set of memory components; reading the target valley using a first read threshold to obtain a first set of data; reading the target valley using a second read threshold to obtain a second set of data; comparing the first set of data to the second set of data; and performing one or more memory operations on the target valley in response to comparing the first set of data to the second set of data.

Example 2. The system of Example 1, the operations comprising: computing a quantity representing a number of bits that are read between the first read threshold and the second read threshold using the first and second sets of data.

Example 3. The system of Example 2, the operations comprising: comparing the quantity to a threshold value; and in response to determining that the quantity transgresses the threshold value, performing an error correction operation as the one or more memory operations.

Example 4. The system of Example 3, wherein the error correction operation comprises adjusting a read threshold associated with reading data from the target valley.

Example 5. The system of any one of Examples 3-4, wherein the error correction operation comprises folding data from the individual memory component to another memory component of the set of memory components or refreshing data stored in the target valley.

Example 6. The system of any one of Examples 3-5, the operations comprising: generating a pass or fail status in response to comparing the quantity to the threshold value.

Example 7. The system of any one of Examples 2-6, the operations comprising: performing an OR logic operation on the first set of data and the second set of data; and counting a number of zeros resulting from performing the OR logic operation to compute the quantity representing the number of bits that are read between the first read threshold and the second read threshold.

Example 8. The system of any one of Examples 2-7, the operations comprising: transmitting the computed quantity to a host device associated with a memory system comprising the set of memory components.

Example 9. The system of any one of Examples 1-8, wherein reading the target valley using the first and second read thresholds is performed in response to a single memory command.

Example 10. The system of Example 9, wherein the single memory command comprises a read disturb scan command.

Example 11. The system of any one of Examples 9-10, wherein the single memory command comprises a media scan command.

Example 12. The system of any one of Examples 1-11, wherein the target valley corresponds to a region between two states of one or more cells of the individual memory component.

Example 13. The system of any one of Examples 1-12, the operations comprising: reading the target valley simultaneously from a plurality of word lines associated with the individual memory component using the first read threshold to obtain the first set of data; and reading the target valley simultaneously from the plurality of word lines associated with the individual memory component using the second read threshold to obtain the second set of data.

Example 14. The system of Example 13, the operations comprising: detecting an error in a read threshold associated with the target valley based on comparing a quantity of bits obtained from the plurality of word lines between the first and second read thresholds to a threshold value.

Example 15. The system of any one of Examples 13-14, wherein the plurality of word lines are non-adjacent word lines.

Example 16. The system of any one of Examples 13-15, the operations comprising: performing an OR logic operation on the first and second sets of data read simultaneously from the plurality of word lines to detect presence of an error in a read threshold associated with the target valley of the individual memory component.

Methods and computer-readable storage medium with instructions for performing any one of the above Examples.

Figure 7:
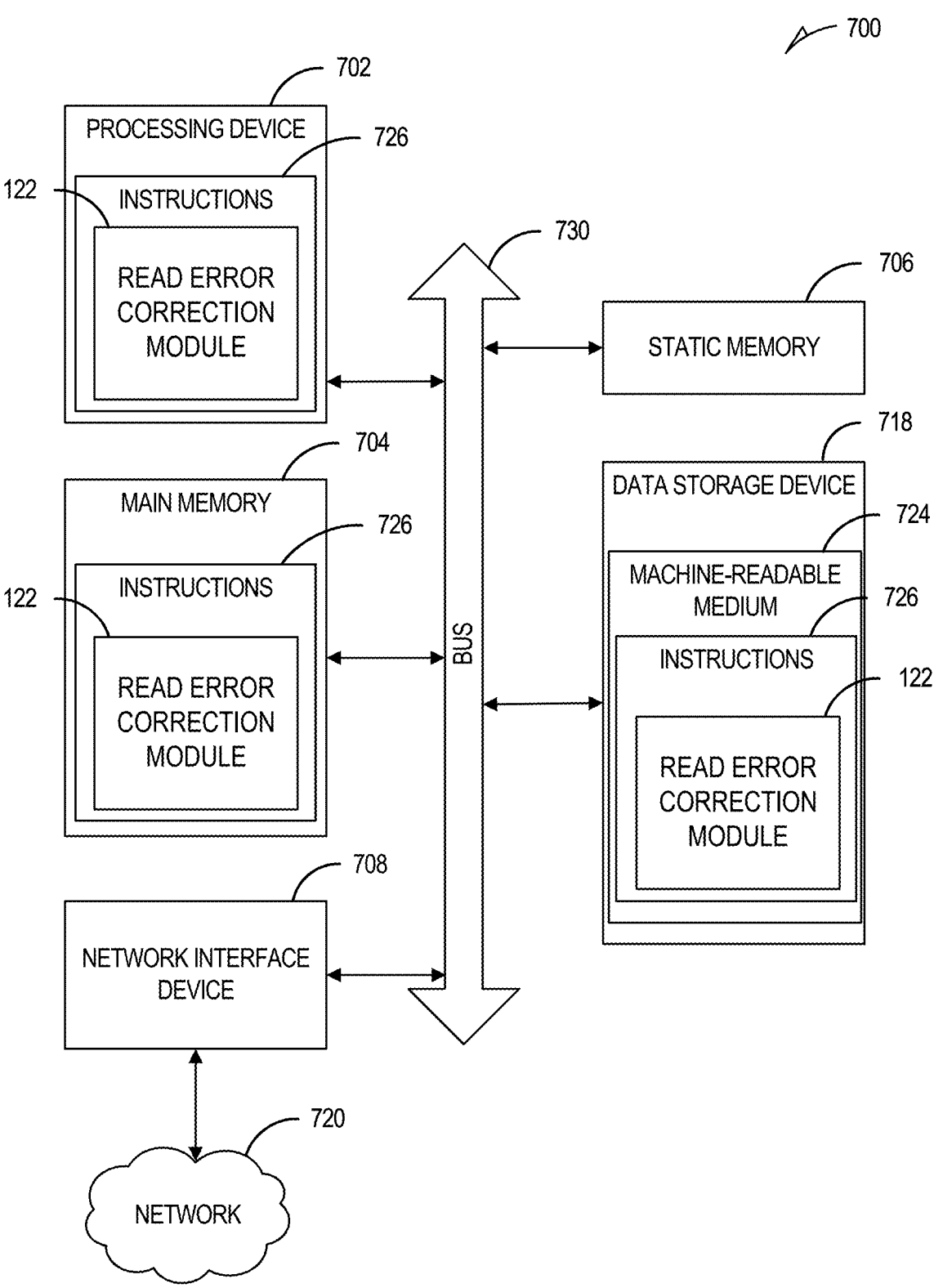
FIG. 7 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the read error correction module 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to zone-based decoding (e.g., the read error correction module 122 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the embodiments of the disclosure as set forth in the following claims. The specification and drawings are, accordingly, to be regarded in an illustrative sense rather than a restrictive sense.

What is claimed is:

1. A system comprising:
a set of memory components; and
at least one processing device, operatively coupled to the set of memory components, configured to perform operations comprising:
determining that a threshold period of time has elapsed since data has been stored to an individual memory component of the set of memory components; and
based on determining that the threshold period of time has elapsed since data has been stored to the individual memory component:
selecting, for inspection, a target valley of a plurality of valleys associated with the individual memory component;
reading the target valley using a first read threshold to obtain a first set of data;
reading the target valley using a second read threshold to obtain a second set of data;
comparing the first set of data to the second set of data comprising counting how many asserted bits result from a logic combination of a first set of bits comprising the first set of data and a second set of bits comprising the second set of data; and
performing one or more memory operations on the target valley based on comparing the first set of data to the second set of data.

2. The system of claim 1, the operations comprising:
computing a quantity representing a number of bits that are read between the first read threshold and the second read threshold using the first and second sets of data.

3. The system of claim 2, the operations comprising:
comparing the quantity to a threshold value; and
in response to determining that the quantity transgresses the threshold value, performing an error correction operation as the one or more memory operations.

4. The system of claim 3, wherein the error correction operation comprises adjusting a read threshold associated with reading data from the target valley.

5. The system of claim 3, wherein the error correction operation comprises folding data from the individual memory component to another memory component of the set of memory components or refreshing data stored in the target valley.

6. The system of claim 3, the operations comprising:
generating a pass or fail status in response to comparing the quantity to the threshold value.

7. The system of claim 2, the operations comprising:
performing an OR logic operation on the first set of data and the second set of data; and
counting a number of zeros resulting from performing the OR logic operation to compute the quantity representing the number of bits that are read between the first read threshold and the second read threshold.

8. The system of claim 2, the operations comprising:
transmitting the computed quantity to a host device associated with a memory system comprising the set of memory components.

9. The system of claim 1, wherein reading the target valley using the first and second read thresholds is performed in response to a single memory command.

10. The system of claim 9, wherein the single memory command comprises a read disturb scan command.

11. The system of claim 9, wherein the single memory command comprises a media scan command.

12. The system of claim 1, wherein the target valley corresponds to a region between two states of one or more cells of the individual memory component.

13. The system of claim 1, the operations comprising:

reading the target valley simultaneously from a plurality of word lines associated with the individual memory component using the first read threshold to obtain the first set of data; and reading the target valley simultaneously from the plurality of word lines associated with the individual memory component using the second read threshold to obtain the second set of data.

14. The system of claim 13, the operations comprising:

detecting an error in a read threshold associated with the target valley based on comparing a quantity of bits obtained from the plurality of word lines between the first and second read thresholds to a threshold value.

15. The system of claim 13, wherein the plurality of word lines are non-adjacent word lines.

16. The system of claim 13, the operations comprising:

performing an OR logic operation on the first and second sets of data read simultaneously from the plurality of word lines to detect presence of an error in a read threshold associated with the target valley of the individual memory component.

17. A method comprising:

determining that a threshold period of time has elapsed since data has been stored to an individual memory component of a set of memory components; and based on determining that the threshold period of time has elapsed since data has been stored to the individual memory component:

selecting, for inspection, a target valley of a plurality of valleys associated with the individual memory component;

reading the target valley using a first read threshold to obtain a first set of data;

reading the target valley using a second read threshold to obtain a second set of data;

comparing the first set of data to the second set of data comprising counting how many asserted bits result from a logic combination of a first set of bits comprising the first set of data and a second set of bits comprising the second set of data; and performing one or more memory operations on the target valley based on comparing the first set of data to the second set of data.

18. The method of claim 17, comprising:

computing a quantity representing a number of bits that are read between the first read threshold and the second read threshold using the first and second sets of data.

19. The method of claim 18, comprising:

comparing the quantity to a threshold value; and in response to determining that the quantity transgresses the threshold value, performing an error correction operation as the one or more memory operations.

20. A non-transitory computer-readable storage medium comprising instructions that, when executed by at least one processing device, cause the at least one processing device to perform operations comprising:

determining that a threshold period of time has elapsed since data has been stored to an individual memory component of a set of memory components; and based on determining that the threshold period of time has elapsed since data has been stored to the individual memory component:

selecting, for inspection, a target valley of a plurality of valleys associated with the individual memory component;

reading the target valley using a first read threshold to obtain a first set of data;

reading the target valley using a second read threshold to obtain a second set of data;

comparing the first set of data to the second set of data comprising counting how many asserted bits result from a logic combination of a first set of bits comprising the first set of data and a second set of bits comprising the second set of data; and performing one or more memory operations on the target valley based on comparing the first set of data to the second set of data.

* * * * *